United States Patent [19]
Schmunk

[11] 3,943,971
[45] Mar. 16, 1976

[54] DIVERTER VALVE
[75] Inventor: John D. Schmunk, Findlay, Ohio
[73] Assignee: Hancor, Inc., Findlay, Ohio
[22] Filed: Apr. 16, 1974
[21] Appl. No.: 461,389

[52] U.S. Cl. ................ 137/610; 137/269; 251/203; 251/334
[51] Int. Cl.² ......................................... F16K 11/00
[58] Field of Search ........ 137/610, 269, 269.5, 270, 137/270.5, 271, 605, 608, 334, 223; 138/94.3, 94; 251/193, 326, 327, 328, 329, 200, 334, 203, 204, 188, 202; 46/90; 220/307; 61/29

[56] References Cited
UNITED STATES PATENTS

| 927,438 | 7/1909 | Thomas ............................. 137/608 |
| 3,180,362 | 4/1965 | Muller ............................... 251/188 |
| 3,316,929 | 5/1967 | Milette.............................. 137/270 |
| 3,342,453 | 9/1967 | Soila et al......................... 251/188 |
| 3,345,034 | 10/1967 | Sherman........................... 251/326 |
| 3,386,700 | 5/1968 | Greene et al. .................... 251/334 |
| 3,829,061 | 8/1974 | Dayne et al...................... 251/329 |

FOREIGN PATENTS OR APPLICATIONS

| 900,403 | 11/1953 | Germany .......................... 251/203 |

OTHER PUBLICATIONS
Porta Plank Water Control Box, Bulletin No. 1161, Wesco Products, Inc., Received 2/26/62, Note Diagram IV on p. 2.

Primary Examiner—William R. Cline
Assistant Examiner—H. Jay Spiegel
Attorney, Agent, or Firm—Fay & Sharpe

[57] ABSTRACT

The specification and drawings disclose a valve assembly particularly suited for use in septic systems for diverting flow from a single inlet to either of two separate outlets. The disclosed valve comprises a relatively thin-walled, blow molded plastic housing which defines a valve chamber having an inlet and two outlets. Valve seats are formed integrally in the housing by the transition surface between the walls of the valve chamber and the outlets. A blow molded plastic valve element is provided which is adapted to be placed in the valve chamber to selectively close off either of the outlets. The valve element includes a hollow, generally wedge-shaped plastic body having a generally conically shaped sealing surface extending outwardly from one side thereof. Boss-like protuberances are provided in the valve chamber adjacent the outlets for releasably holding the valve element in position adjacent the selected outlet. The protuberances are such that the valve element can be manually snapped into and out of position. Additionally, the protuberances are located such that when the valve element is in position adjacent the outlet, the conical sealing surface is slightly deflected by the seats to increase the sealing pressure.

9 Claims, 5 Drawing Figures

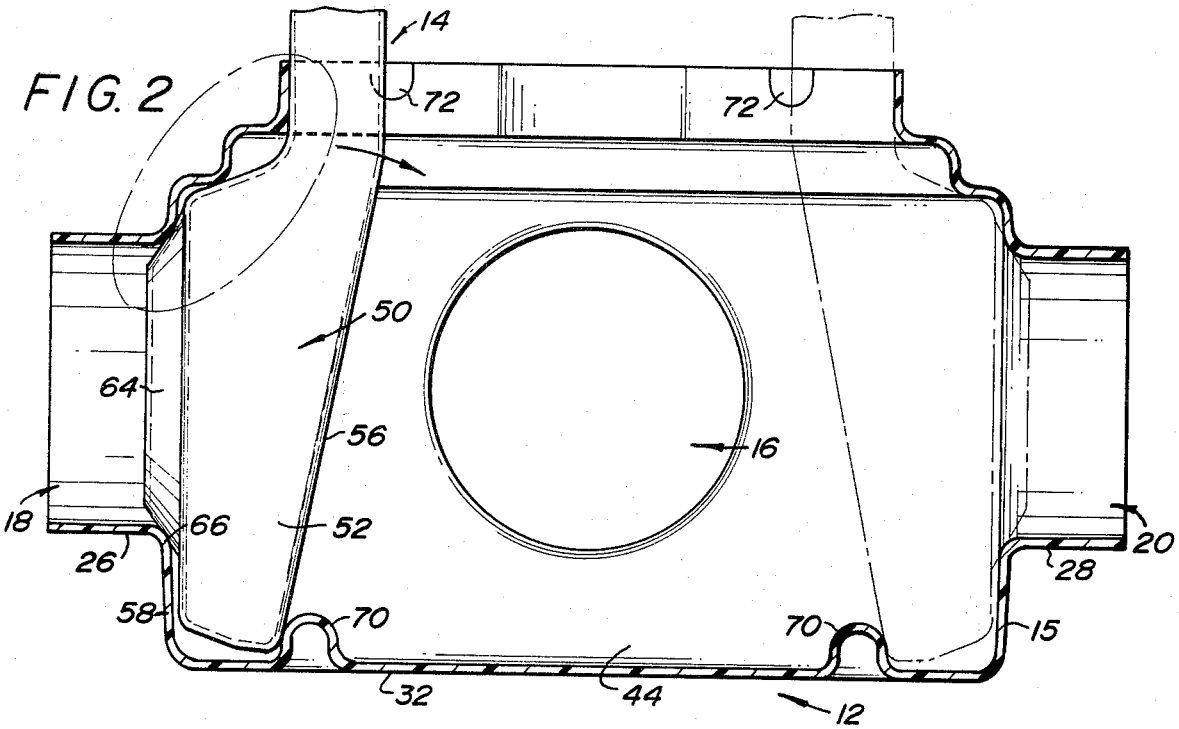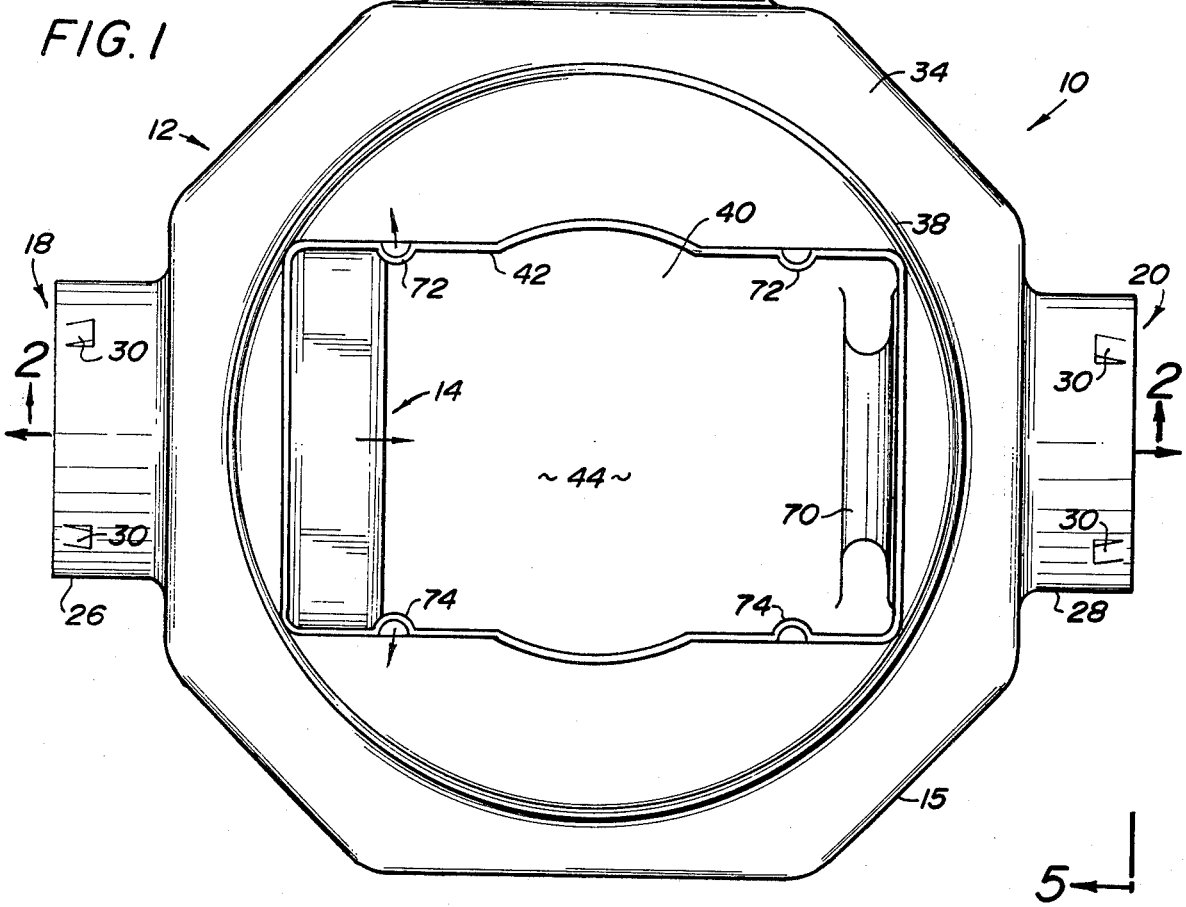

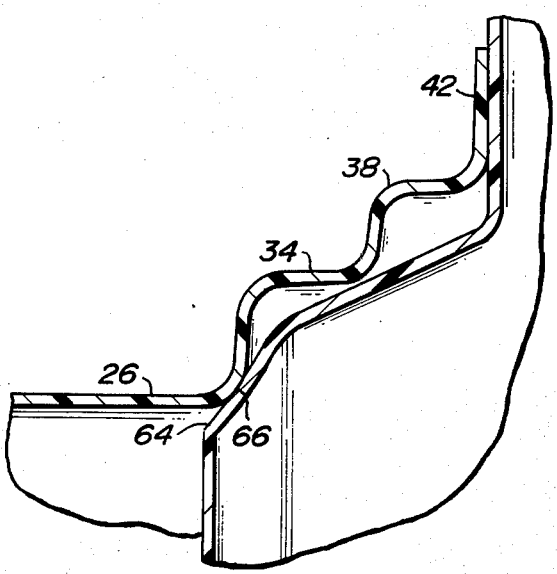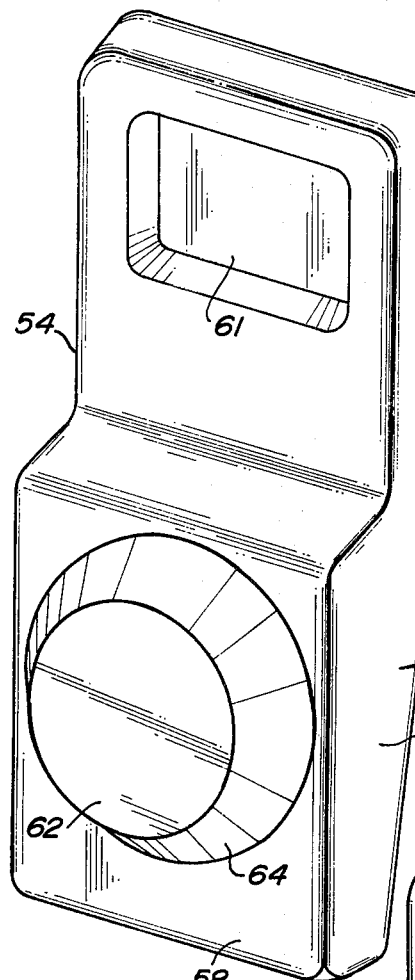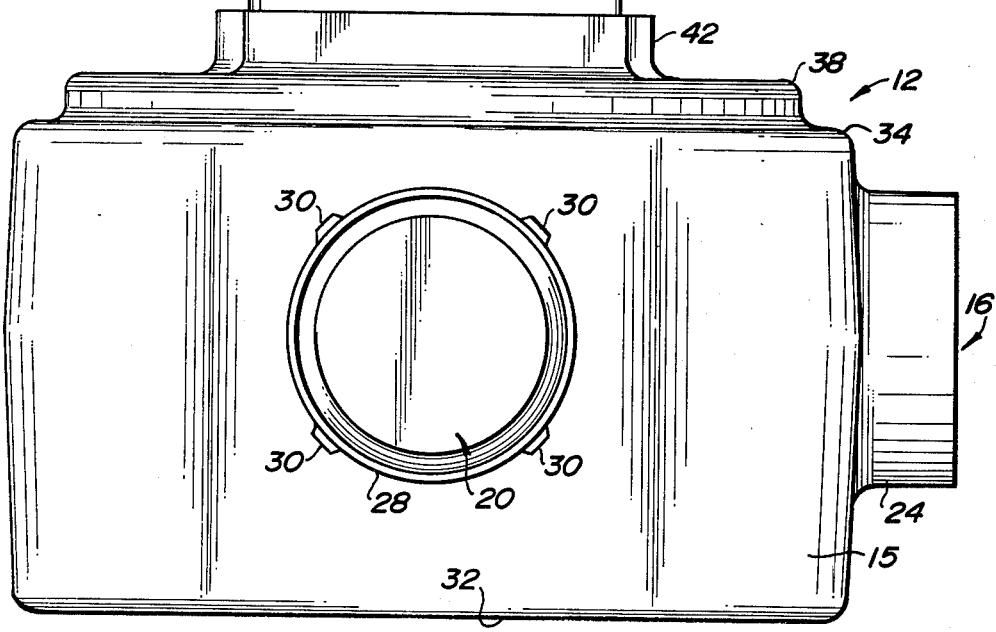

DIVERTER VALVE

BACKGROUND OF THE INVENTION

The subject invention is directed toward the valve art and, more particularly, to a valve for selectively diverting fluid flow between plural outlets.

The valve is especially suited for use in septic systems for controlling flow of septic tank effluent to a plurality of septic leach beds and will be described with particular reference thereto; however, as will become apparent, the invention is capable of broader application and could be embodied in valves useful for a variety of purposes.

In septic tank systems, it is sometimes desirable, because of soil conditions and other factors, to provide each septic tank with two separate leach beds or drain fields. The effluent from the tank can be alternated between the two beds at periodic intervals. This allows the beds to, in effect, revitalize themselves during periods of non-use.

A valve useful for performing the diverting or alternating a function must be capable of withstanding relatively adverse operating conditions. Moreover, if the valve is to be economically compatible with the typical septic system, it must be available in large sizes at a relatively low cost. Additionally, it should be lightweight and require little or no maintenance.

BRIEF DESCRIPTION OF THE INVENTION

The subject invention provides a valve structure which meets the above-mentioned criteria. According to one aspect of the invention, the valve comprises a housing defining a valve chamber with an inlet and one or more outlets. Preferably, but not necessarily, the valve housing is formed from blow molded plastic and has a relatively thin wall with the inlet and outlets formed integrally with the housing. Formed about each outlet is a valve seat which is a transition surface between the walls of the housing and the outlet. A valve element adapted to be manually placed in and removed from the chamber is provided to selectively close off or open the outlet. The valve element is preferably a unitary blow molded plastic element including a body with a generally conically shaped sealing surface extending outwardly therefrom. At least the portion of the body which defines the sealing surface is hollow and has a relatively thin resilient wall. Formed within the valve chamber are stationary retaining means which serve to releasably hold the valve element in position adjacent the outlet. The retaining means are located such that when the valve element is in position adjacent the outlet, the conical sealing surface is deflected by the seat a slight amount so as to increase the sealing pressure between the seat surface and the sealing surface.

In the embodiment disclosed, the stationary retaining means are merely bosses or raised portions in the wall of the valve housing which engage behind the valve element when it is in position. Additionally, the bosses or raised portions are arranged so that at least some of them can be deflected to permit the valve element to be manually snapped in or removed from the sealing position adjacent the outlet.

As can be appreciated, the entire valve assembly can be a simple two-part molded plastic structure. There is no requirement for complicated actuating mechanisms or the like. Moreover, the design is such that valves of extremely large size can be economically produced. Similarly, the weight of the entire valve assembly can be minimal.

Accordingly, a primary object of the subject invention is the provision of a valve assembly which is particularly useful as a diverter valve in septic tank systems.

Yet another object of the invention is the provision of a highly-simplified valve structure which can be formed with conventional blow molding techniques.

Yet a still further object of the invention is the provision of a valve of the general type described which requires only two components and which can be formed rapidly and economically.

BRIEF DESCRIPTION OF THE DRAWINGS

The above and other objects and advantages will become apparent from the following description when read in conjunction with the accompanying drawings wherein:

FIG. 1 is a plan view of a diverter valve formed in accordance with a preferred embodiment of the invention;

FIG. 2 is a cross-sectional view taken on line 2—2 of FIG. 1 (the valve element is shown in one location in solid lines and in an alternate location with dash-dot lines);

FIG. 3 is an enlarged view of the circled area of FIG. 2;

FIG. 4 is a pictorial view of the valve element; and,

FIG. 5 is an end view taken on line 5—5 of FIG. 1.

DETAILED DESCRIPTION OF THE PREFERRED EMBODIMENT

Referring more particularly to the drawings wherein the showings are for the purposes of illustrating a preferred embodiment of the invention only, and not for the purpose of limiting same, FIGS. 1, 2 and 5 show the overall arrangement of the diverter valve 10 which comprises a housing or body 12 and a valve element 14.

In the embodiment under consideration, the valve 10 is arranged to control flow entering an inlet 16 between either of two separate outlets 18 and 20 as, for example, when the valve is used as a diverter valve for the effluent coming from a septic tank. It should be understood that inlet 16 would be suitably connected to the septic tank and the outlets 18 and 20 would normally be connected to separate leach beds.

The housing 12 could be formed from many different materials and take a variety of specific configurations. However, in the subject embodiment, the housing 12 is formed from a suitable plastic material such as high-density polyethylene, polyvinyl chloride or the like. Preferably, the housing is formed by conventional blow molding techniques and has a side wall 15 having a generally octagonal configuration in plan as viewed in FIG. 1. The inlet 16 is formed integrally with the side wall 15 of housing 12 and has a circular shape with a cylindrical sleeve or collar 24 sized so as to be compatible with the effluent line coming from an associated septic tank. The outlets 18 and 20 are axially aligned and disposed on diametrically opposite sides of the housing 12. Each of the outlets 18 and 20 are of circular configuration and include a respective cylindrical sleeve portion 26 and 28 which is formed integrally with the housing. In the embodiment illustrated, each of the sleeves 26 and 28 are provided with members 30 of the type illustrated in commonly assigned U.S. Pat. No. 3,695,643. Members 30 allow the outlets to be directly connected to conventional corrugated tubing of the type currently often used for septic leach bed systems. It should be appreciated, however, that the particular form of connecting means provided form no part of the invention. Other joint structures or connecting means could equally well be used.

The bottom of the housing 12 is closed by an integral wall 32, whereas, the upper end of the housing is provided with a top wall 34 which includes a circular stepped portion 38 and a generally rectangular opening 40. A vertically extending flange 42 extends upwardly about the opening 40.

The interior of the housing 12 forms a valve chamber 44. The valve element 14 is adapted to be received within the chamber 44 and is arranged so that it can be positioned to alternately block flow through either of the outlets 18 or 20. The overall arrangement of the valve element 14 can best be seen with reference to FIGS. 2 and 4. In general, it comprises a body 50 which is preferably formed from plastic through conventional blow molding techniques. Although it can be formed from many different materials, it is preferably formed from high-density polyethylene or polyvinyl chloride or the like. In particular, body 50 is hollow and includes a pair of spaced side walls 52, 54. The lower end of element 14 has a somewhat wedged shape configuration defined by a rear wall 56 which joins between the side walls 52, 54. A front face 58 is similarly joined between the side walls 52, 54. The upper end of the body 50 has a generally rectangular configuration and serves as a handle 60 to permit the valve element to be manipulated within the valve chamber 44 and selectively shifted between the outlets 18 and 20 in a manner subsequently to be described. It should be noted that handle 60 is molded with a depressed finger grip portion 61.

Extending outwardly from the front face 58 of valve member 14 is a truncated, generally conically shaped wall portion 62. The wall portion 62 is integral with the face 58 and defines a conical sealing surface 64. The surface 64 is sized so that it is received in the outlet 18 in the manner shown in FIG. 2. Note that the transition surface 66 between the outlet sleeve 26 and the side wall of the housing has a generally arcuate configuration and defines a valve seat. The surface 64 is sized so that the transition surface 66 will engage somewhere approximately midway between the maximum and minimum diameters of surface 64.

As can be appreciated, means must be provided to permit the valve element to be held in location adjacent a selected outlet. For this reason, releasable stationary retaining means are provided to maintain the valve element 14 in position with the sealing surface 64 tightly engaged with the transition or seat surface 66. In particular, the valve housing 12 is provided with internal boss-like protuberances 70, 72 and 74. A pair of the protuberances 72 and 74 are associated with each of the outlets 18 and 20. Similarly, one of the protuberances 70 is positioned adjacent each of the outlets 18 and 20 and extends generally perpendicular to the axis of the respective outlet. Referring again to the protuberances 72 and 74, it will be noted that they are formed on the upwardly extending flange 42 which extends about the top opening 40. The protuberances 72 and 74 are carried on the flange and can be resiliently displaced in a lateral direction relative to the axis of the outlet. As best seen in FIG. 2, the protuberances 70, 72 and 74 are located such that when the valve element 14 is in position adjacent a selected outlet, the protuberances engage the rear face of the valve element to hold it firmly in position relative to the outlet. The resiliently displaceable nature of the protuberances 72 and 74 permit the valve element to be manually snapped out of position adjacent the outlet. Note that the solid line element 14 of FIG. 2 can be rotated in a clockwise direction about its lower end to permit it to be removed from its sealing position in outlet 18. During this clockwise movement, the associated protuberances 72, 74 are moved in an outward direction as shown by the small arrows associated therewith. Thus, the valve element 14 can be snapped out of position and moved to the other outlet. To reposition the valve element, it is only necessary to insert its lower end between the side wall 15 and associated protuberance 70 and rotate it so that its upper end is received between the protuberances 72, 74.

One relationship between the valve housing and the valve element which is comparatively important is the positioning of the retaining means or protuberances 70, 72 and 74. As best illustrated in FIG. 3, it is highly preferable that the protuberances be located such that when the valve is in position, the sealing face 64 is slightly deflected in the manner shown. This acts to maintain a relatively tight pressure seal between the seat 66 and the surface 64. As shown, the conical wall 64 must deflect slightly when the valve is maintained in position by the protuberances. The inherent resiliency of the hollow plastic valve member thus maintains a good pressure seal.

Although not previously discussed, the handle portion 60 of the valve member 14 extends outwardly through the open top 40 of the housing. In normal use, the valve 10 will be positioned beneath the ground level such that the center lines of its inlets and outlets correspond with the center lines of the associated septic drain and leach beds. So as to permit manual access to the valve elements for shifting between the two outlets, a manhole or large diameter section of piping extends outwardly from the round stepped diameter portion 38 of the top of the housing. This is not shown in the subject drawing since it forms no particular part of the invention. It should be recognized that in certain installations a cover could be placed directly over the handles to close the upper end of the valve.

The invention has been described in great detail sufficient to enable one of ordinary skill in the art to make and use the same. Obviously, modifications and alterations of the preferred embodiment will occur to others upon a reading and understanding of the specification and it is my intention to include all such modifications and alterations as part of my invention insofar as they come within the scope of the appended claims.

Having thus described my invention, I claim:

1. A diverter valve comprising:
   a housing having a continuous side wall, a bottom wall and a top wall defining a hollow valve chamber, said housing including an inlet opening and said side wall including at least two spaced apart outlet openings with said inlet and outlet openings communicating from outside said housing with said chamber, said top wall including a valve element receiving opening and said housing further having a valve seat disposed around each of said at least two outlet openings;
   a valve element receivable in said chamber through said element receiving opening and movable through said receiving opening between separate spaced blocking positions in said chamber for selectively blocking at least one of said outlets and allowing communication through said chamber between said inlet and the other of said outlets, said valve element comprising a body having top and bottom portions and front and rear face portions, said front face portion having an outwardly extending generally conically shaped resilient sealing surface; and, valve element locating and retaining means disposed in said chamber for releasably retaining said valve element in said separate blocking positions, said locating and retaining means being located such that when said valve element is in a blocking position with said at least one outlet, said resilient sealing surface is deflected by the valve seat associated with said at least one outlet.

2. The valve as defined in claim 1 wherein at least that portion of said valve element body which defines said sealing surface is hollow and has a relatively thin resilient wall.

3. The valve as defined in claim 1 wherein said locating and retaining means comprises boss-like members formed in said chamber and spaced from said outlets a distance such as to engage said valve element on said rear face portion.

4. The valve as defined in claim 1 wherein said locating and retaining means comprises boss-like members capable of resiliently deflecting to permit said valve element to be manually moved into and out of said blocking positions.

5. The valve as defined in claim 1 wherein said housing is formed substantially entirely of plastic and wherein said valve seats are at the juncture of said outlets and said chamber.

6. A diverter valve comprising:

a housing having a continuous side wall, a bottom wall and a top wall defining a hollow valve chamber, said housing including an outlet opening and said side wall including first and second spaced apart outlet openings with said inlet and outlet openings communicating from outside said housing with said chamber, said top wall having a valve element receiving opening and said housing further including a valve seat disposed around each of said outlet openings;

a valve element comprised of a body having top and bottom portions and front and rear face portions, said front face portion having an outwardly extending generally conically shaped resilient sealing surface, said valve element being insertable through said receiving opening into a first blocking position blocking said first outlet while allowing communication through said chamber between said inlet and said second outlet, said valve element being selectively movable through said receiving opening from said first blocking position to a separate second blocking position blocking said second outlet while allowing communication through said chamber between said inlet and said first outlet; and, valve element locating and retaining means disposed in said chamber and associated with said first and second outlets for releasably retaining said valve element in said separate first and second blocking positions, said locating and retaining means being located such that when said valve element is in one of said blocking positions, said resilient sealing surface is deflected by the valve seat associated with the outlet being blocked.

7. The valve as defined in claim 6 wherein said housing is formed substantially entirely of plastic and wherein said seats are an integral part of said housing and are formed by transition surfaces between said valve chamber and said outlets.

8. The valve as defined in claim 7 wherein said locating and retaining means includes boss-like members formed in said chamber and capable of resiliently deflecting laterally of the outlets for permitting movement of said valve member into and out of position adjacent said outlets.

9. The valve as defined in claim 7 wherein said valve element comprises a one-piece molded plastic member having a handle portion formed integrally therewith, said handle portion extending outwardly of said valve chamber through said valve element receiving opening.

* * * * *